March 17, 1936. C. E. L. LIPMAN Re. 19,893

MAGNETIC UNLOADER

Original Filed Feb. 27, 1931 2 Sheets-Sheet 1

Witness:
R. B. Davison.

Inventor:
Carl E. L. Lipman,
By: Wilson, Dowell, McCanna & Behm
Attys

March 17, 1936. C. E. L. LIPMAN Re. 19,893

MAGNETIC UNLOADER

Original Filed Feb. 27, 1931 2 Sheets-Sheet 2

Witness:
R. B. Davison

Inventor:
Carl E. L. Lipman
By: Wilson, Dowell, McCanna & Rehm
Attys

Reissued Mar. 17, 1936

Re. 19,893

UNITED STATES PATENT OFFICE 19,893

MAGNETIC UNLOADER

Carl E. L. Lipman, Chicago, Ill., assignor, by mesne assignments, to Servel, Inc., a corporation of Delaware Original No. 1,899,341, dated February 28, 1933, Serial No. 518,746, February 27, 1931. Application for reissue April 27, 1934, Serial No. 722,735

12 Claims. (Cl. 62—4)

This invention relates to refrigerating systems of the compressor condenser evaporator type. In this type of refrigerating system and more particularly in this type of system wherein the motor compressor is a hermetically sealed unit, it is desirable and in some instances necessary for the proper and successful operation of the system, to substantially equalize the pressures upon the high and low sides when the compressor is started.

The purpose of this is to reduce the resistance to starting of the motor compressor unit and thereby reduce the load upon the motor at starting. This permits the use of a motor of minimum capacity for the actual work during running periods which is also very desirable in sealed units. It is also necessary of course to prevent the warm refrigerant from passing back through the suction line to the low side and into the evaporator between running periods or when the pressures upon the high and low sides of the compressor are equalized. Otherwise the reverse flow of refrigerant will transfer heat to the expansion or evaporating element and result in a considerable loss in efficiency.

It is therefore an object of this invention to provide in a refrigerating system of the above character means for materially reducing the pressure in the high side of the system when the compressor is stopped or just before restarting without allowing the refrigerant under low pressure to enter the low side as far back as the expansion or evaporating element.

In accordance with this invention advantage is taken of the increase of current during starting of the motor compressor unit to cause substantial equalization of pressures upon the low and high sides of the compressor. Furthermore, in units in which the oil and refrigerant is discharged together over the motor, advantage is also taken of the oil dripping from the motor to cooperate with the unloading valve to cause the same to seal tightly during normal running periods of the motor compressor unit.

Other and further objects and their advantages resulting from this invention will be apparent as the same becomes better understood from an examination of the specification and claims in connection with the accompanying drawings, wherein:

Figure 2:
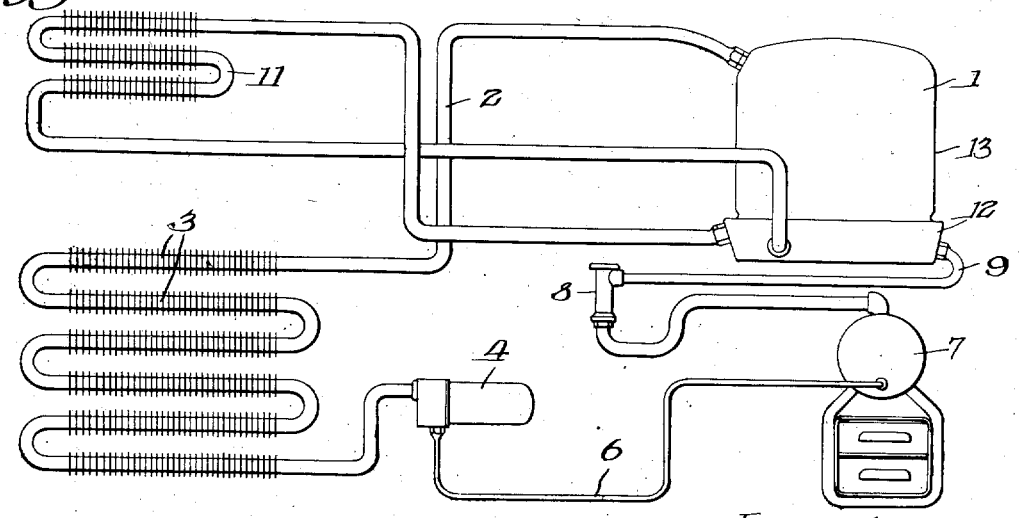
Fig. 2 is a diagrammatic illustration of a refrigerating system having incorporated therein a motor compressor unit including an unloader device embodying the features of this invention.
Figure 3:
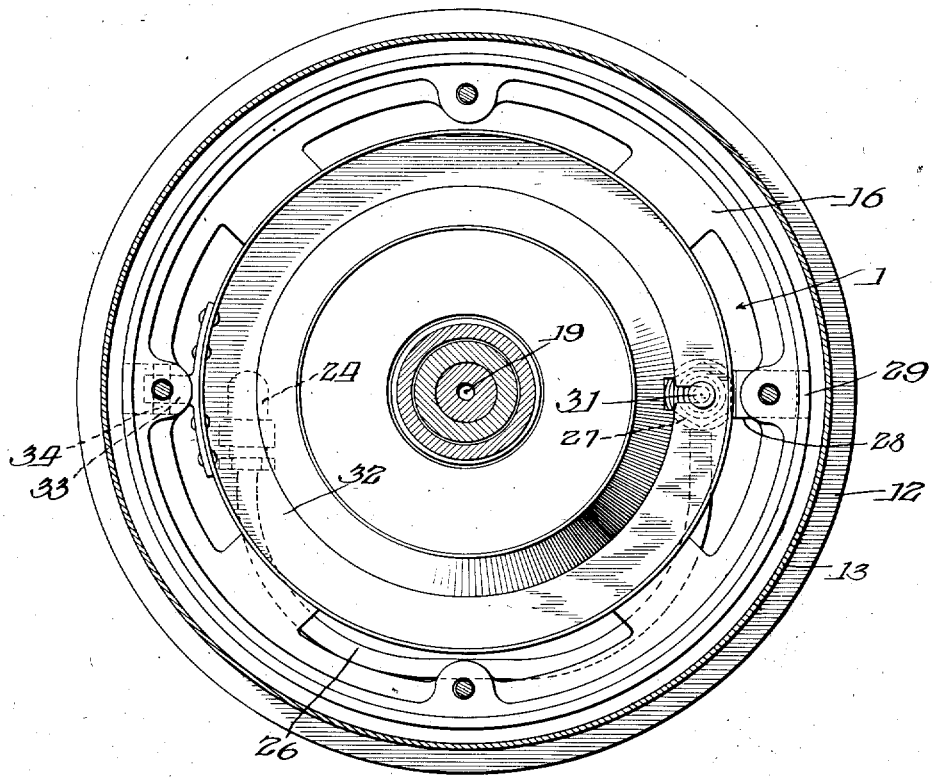
Fig. 3 is a transverse section taken on line 3—3 of Fig. 1 with the motor elements removed.
Figure 4:
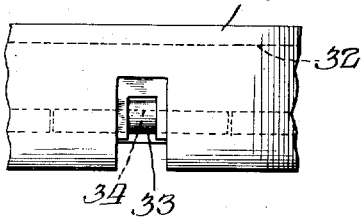
Fig. 4 is a fragmentary detail taken on line 4—4 of Fig. 1.
Figure 5:
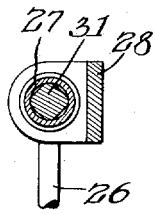
Fig. 5 is a fragmentary section taken on line 5—5 of Fig. 1.
Figure 6:
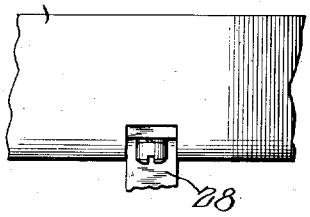
Fig. 6 is a fragmentary detail taken on line 6—6 of Fig. 1.

Referring more particularly to Fig. 2, it will be seen that the refrigerating system includes a hermetically sealed motor compressor unit 1 which delivers refrigerant under pressure through pipe 2 to the condenser 3 for liquefying the same. The liquid refrigerant then passes through float chamber 4, through pipe 6, to the evaporator 7 after which the vaporized refrigerant is withdrawn from evaporator 7 through a check valve 8 and is returned to the suction side of the compressor through pipe 9. In the illustrated motor compressor unit, the lubricating oil is circulated in part at least through a cooling coil 11 and is returned to the unit and discharged in part at least through the center of the motor shaft with the refrigerant. The oil thus circulated will drain down over the motor.

Figure 1:
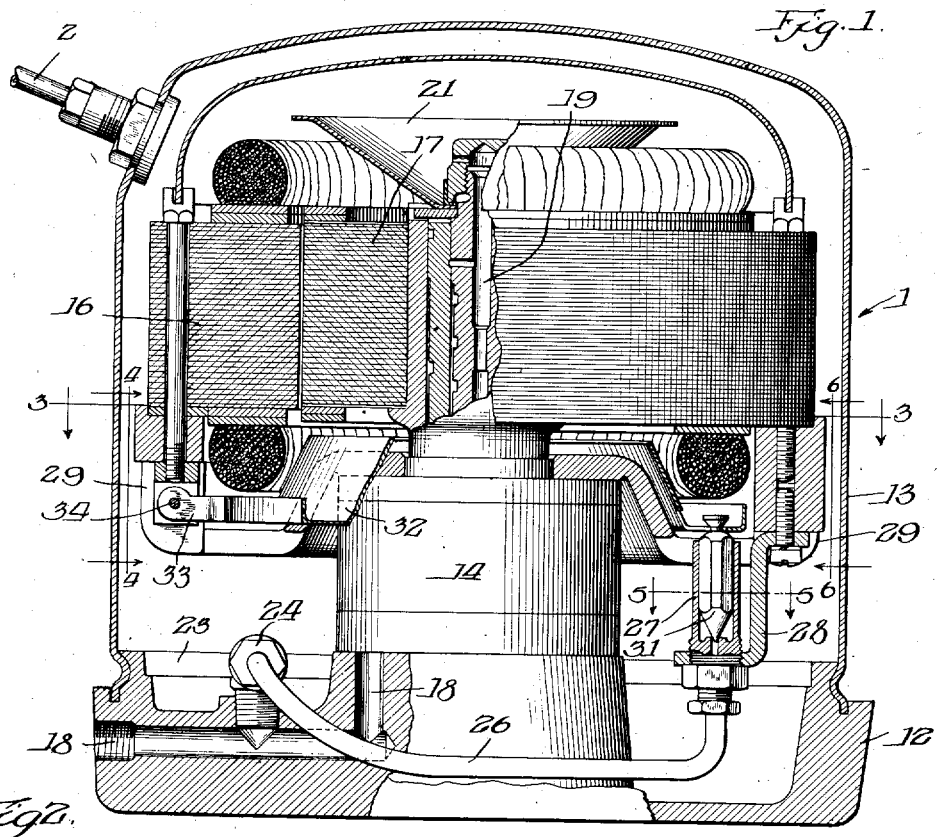
Fig. 1 is a transverse vertical section through a motor compressor unit having incorporated therein an unloading device constructed and arranged in accordance with this invention.

With particular reference to Fig. 1, it will be seen that the motor compressor unit illustrated is mounted upon a base 12 and is hermetically sealed by means of a cup-shaped casing or dome 13, the open end of which is secured and sealed to a base 12. The unit itself comprises a compressor 14 driven by an electric motor comprising a stator 16 and a rotor 17. A three phase induction motor has been found a very satisfactory driving motor. The compressor is arranged to receive refrigerant through an inlet or suction duct 18 formed in the base and to discharge the same into the interior of the dome and to circulate a portion or all of the lubricating oil through a center bore 19 in the shaft. The lubricant is thrown outwardly against a baffle or distributor 21 and falls down over the stator to the base of the motor, being collected in a well or sump 23. It will be understood that inasmuch as the interior of the dome receives the compressed refrigerant it is therefore under the pressure of the compressed refrigerant.

Normally upon stopping of the driving motor the refrigerant upon the discharge side of the compressor and within the casing 13 is under relatively high pressure whereas the refrigerant upon the suction side of the compressor is a relatively lower pressure. At starting, this condition would necessitate that the compressor be started under load against the high pressure of the discharge side. In order to eliminate this load or "unload" the compressor means are provided for equalizing the pressure or at least substantially reducing the pressure of the discharge side of the condenser. For this purpose a connection 24 is made into duct 18 which leads through pipe 26 to a valve 27 communicating with the interior of the dome or high pressure side. Valve 27 is conveniently secured by a bracket 28 to the spider 29 supporting the stator of the driving motor. The valve includes a flat sided closure member 31 slidingly mounted within casing 27 to permit passage of gas therebetween when in open position. The upper end of the valve interlocks through a loose connection with an annular tray-like actuating member 32 of magnetic material which underlies the stator coils in the direct path of the magnetic field emanating from the same. The actuating member is secured to an arm 33 which is pivoted at 34 to the spider 29.

The tray member 32 is also arranged to catch a certain amount of the oil dripping from the stator coils. The oil collected by the tray will pass through the loose connection of the valve member where it is interlocked to the tray and will pass down the sides of the valve member 31 and effectively seal the seating end.

It can be seen from the foregoing description that valve 27 with its closure member 31 will, when the valve is open, connect the suction side to the interior of the shell and thereby equalize the pressures on both sides of the compressor. Check valve 8 will prevent the gases from passing back through the system beyond that point.

It is well known that the starting currents of an electric motor even when unloaded and more so when loaded are materially higher or greater than the normal running current. The mass of the tray-like actuating member is sufficient to maintain the tray in its lowermost position and thereby hold the valve closed and with oil therein their combined weights are more than sufficient to hold the tray in its lowermost position with the normal running current passing through the stator coils. The weight, however, is not sufficient to maintain the tray member in lowermost position against the strong effect of the abnormal field caused by the increased starting currents through the stator windings. Upon starting therefore the increased field set up by the higher currents passing through the stator windings will cause the tray-like member to be raised thus raising the valve closure member 31 to equalize the pressures upon both sides of the compressor. If the motor has been standing idle for a considerable length of time the oil will have drained out of the tray-like member sealing the valve and lightening the actuating member which will even further insure the immediate raising thereof when starting the motor.

It will be seen from the foregoing description that there has been provided an unloading device particularly well adapted for hermetically sealed motor compressor units inasmuch as the valve and actuating mechanism are conveniently located within the sealing dome. Furthermore, the unloader requires no external source of power for operation but works automatically upon the starting of the unit.

It is obvious that many changes may be made in the details of construction without departing from the spirit and scope of this invention as defined by the claims.

I claim:

1. In a refrigerating device, a refrigerant circulatory system including a heat exchange element, a condenser, and a compressor, an electric motor for driving said compressor, a connection from the high pressure side of the compressor to the low pressure side thereof, a valve in said connection, an actuating member of magnetic material for said valve disposed adjacent the stator of said motor in position to be affected by the field emanating therefrom, said actuating member being of sufficient weight to be unaffected by the normal field emanating from said stator but to be moved by the abnormal field caused by starting currents through said stator.

2. In a refrigerating device, a refrigerant circulatory system including a heat exchange element, a condenser, and a compressor, an electric motor for driving said compressor, a connection from the high pressure side of the compressor to the low pressure side thereof, a valve in said connection, a tray-like actuating member of magnetic material for said valve disposed adjacent the stator of said motor in position to be affected by the field emanating therefrom.

3. In a refrigerating device, a refrigerant circulatory system including a heat exchange element, a condenser, and a compressor, an electric motor for driving said compressor, a connection from the high pressure side of the compressor to the low pressure side thereof, a valve in said connection, an annular tray-like actuating member for said valve disposed beneath the stator of said motor and arranged to receive lubricating oil dripping from said stator.

4. In a refrigerating device, a refrigerant circulatory system including a heat exchange element, a condenser, and a compressor, an electric motor for driving said compressor, a connection from the high pressure side of the compressor to the low pressure side thereof, a valve in said connection, an annular tray-like actuating member for said valve disposed beneath the stator of said motor and arranged to receive lubricating oil dripping from said stator, said actuating member being loosely connected to said valve to operate the same and to permit the oil collected therein to flow around said valve to seal the latter.

5. In a refrigerating system, a compressor, an electric motor for driving said compressor, an evaporator for receiving refrigerant from said compressor, a check valve in the suction line between said evaporator and said compressor, a connection from the high pressure side of said compressor to the low pressure side thereof between said check valve and the compressor, a valve in said connection, and means responsive to the increased magnetic field around the motor and set up by the starting current of said motor for controlling said valve.

6. In a refrigerating system, a compressor, an electric motor for driving said compressor, an evaporator for receiving refrigerant from said compressor, a check valve in the suction line between said evaporator and said compressor, a connection from the high pressure side of said compressor to the low pressure side thereof between said check valve and the compressor, a valve in said connection, and means responsive to the starting current of said motor for controlling said valve, said means comprising a movable member of magnetic material disposed in the path of the magnetic field emanating from said motor elements.

7. In a refrigerating system, a compressor, an electric motor for driving said compressor, an evaporator for receiving refrigerant from said compressor, a check valve in the suction line between said evaporator and said compressor, a connection from the high pressure side of said compressor to the low pressure side thereof between said check valve and the compressor, a valve in said connection, and means responsive to the starting current of said motor for controlling said valve, said means comprising a tray-like pivoted lever disposed beneath said motor and in position to be affected by the field emanating therefrom.

8. In a refrigerating system, a compressor, an electric motor for driving said compressor, an evaporator for receiving refrigerant from said compressor, a check valve in the suction line between said evaporator and said compressor, a connection from the high pressure side of said compressor to the low pressure side thereof between said check valve and the compressor, a valve in said connection, and means responsive to the starting current of said motor for controlling said valve, said means comprising an annular tray-like member disposed beneath a stator of said motor and in position to be affected by the field emanating therefrom.

9. In a refrigerating system, a compressor, an electric motor for driving said compressor, an evaporator for receiving refrigerant from said compressor, a check valve in the suction line between said evaporator and said compressor, a connection from the high pressure side of said compressor to the low pressure side thereof between said check valve and the compressor, a valve in said connection, and means responsive to the starting current of said motor for controlling said valve, said means comprising a pivoted annular tray-like member disposed beneath a stator of said motor and in position to be affected by the field emanating therefrom.

10. In a refrigerating system, a compressor, an electric motor for driving said compressor, an evaporator for receiving refrigerant from said compressor, means to unload said motor, an initiating member of magnetic material adapted to be disposed in the leakage field of said motor and to be raised in opposition to the force of gravity upon increase in strength of the magnetic leakage field of said motor, and means whereby the initiating member actuates the unloading means in response to leakage field variations.

11. In a refrigerating system, a compressor, an electric motor for driving said compressor, an evaporator for receiving refrigerant from said compressor, means to unload said motor, an annular member of magnetic material adapted to be disposed below the motor and in the leakage field thereof and to be raised in opposition to the force of gravity upon increase in strength of the magnetic leakage field of said motor, and means whereby the annular member actuates the unloading means in response to leakage field variations.

12. In a refrigerating system, a compressor, an electric motor for driving said compressor, an evaporator for receiving refrigerant from said compressor, an unloading valve for said compressor, and means for actuating said valve including an annular member of magnetic material so located below said motor as to be raised against the force of gravity upon increase in strength of the magnetic leakage field of said motor.

CARL E. L. LIPMAN.